(12) United States Patent
Kadota

(10) Patent No.: US 11,405,178 B2
(45) Date of Patent: Aug. 2, 2022

(54) COMMUNICATION APPARATUS AND CONTROL METHOD

(71) Applicant: CANON KABUSHIKI KAISHA, Tokyo (JP)

(72) Inventor: Eiji Kadota, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 526 days.

(21) Appl. No.: 16/522,709

(22) Filed: Jul. 26, 2019

(65) Prior Publication Data
US 2020/0044820 A1 Feb. 6, 2020

(30) Foreign Application Priority Data

Jul. 31, 2018 (JP) .............................. JP2018-144030

(51) Int. Cl.
*H04L 29/06* (2006.01)
*H04L 9/06* (2006.01)
(Continued)

(52) U.S. Cl.
CPC .......... *H04L 9/0618* (2013.01); *G06F 3/1222* (2013.01); *G06F 3/1238* (2013.01);
(Continued)

(58) Field of Classification Search
CPC . H04L 9/0618; H04L 9/0869; H04L 63/0428; H04L 2209/805; H04L 9/088;
(Continued)

(56) References Cited

U.S. PATENT DOCUMENTS 7,260,720 B2 * 8/2007 Yamamoto .............. H04L 63/02
713/168
8,484,485 B2 7/2013 Nonaka et al.
(Continued)

FOREIGN PATENT DOCUMENTS

CN 103475451 A 12/2013
CN 104639561 A 5/2015
(Continued)

OTHER PUBLICATIONS

Chinese Office Action dated Sep. 13, 2021, in related Chinese Patent Application No. 201910698972.5 (with English translation).
(Continued)

*Primary Examiner* — Harunur Rashid
(74) *Attorney, Agent, or Firm* — Venable LLP

(57) ABSTRACT

A communication apparatus includes a communication unit having a first storage area of a predetermined size in which access from another apparatus is permitted and a second storage area of the predetermined size in which access from the other apparatus is permitted, and an encryption unit to generate concatenated encrypted data by using a block encryption method to encrypt a plurality of pieces of data which are to be read out by the other apparatus and encrypted. Data different from the concatenated encrypted data is held in the second storage area, and the concatenated encrypted data generated by the encryption unit is of a size not exceeding the predetermined size and is held in the first storage area. In addition, the size of padding data included in the concatenated encrypted data is smaller than a total size of padding data generated by individually encrypting the plurality of pieces of data.

28 Claims, 11 Drawing Sheets

(51) Int. Cl.
  *H04W 4/80*     (2018.01)
  *H04W 76/10*    (2018.01)
  *G06F 3/12*     (2006.01)
  *H04W 12/00*    (2021.01)
  *H04L 9/08*     (2006.01)
  *H04L 9/40*     (2022.01)

(52) U.S. Cl.
  CPC .......... *G06F 3/1292* (2013.01); *H04L 9/0869* (2013.01); *H04L 63/0428* (2013.01); *H04W 4/80* (2018.02); *H04W 12/009* (2019.01); *H04W 76/10* (2018.02)

(58) Field of Classification Search
  CPC ............... H04L 9/0894; H04L 2209/20; H04L 2209/80; G06F 3/1222; G06F 3/1238; G06F 3/1292; H04W 4/80; H04W 12/009; H04W 76/10; H04W 12/03; H04W 88/06; H04N 1/00236; H04N 1/00233
  See application file for complete search history.

(56) References Cited

U.S. PATENT DOCUMENTS

| | | | |
|---|---|---|---|
| 10,397,963 B2 | 8/2019 | Ito et al. | |
| 10,652,415 B2 | 5/2020 | Kadota | |
| 10,705,898 B2* | 7/2020 | Goodes | H03M 13/09 |
| 2005/0157871 A1* | 7/2005 | Komano | H04L 9/3247 380/28 |
| 2008/0025509 A1* | 1/2008 | Van De Ven | H04L 9/0637 380/210 |
| 2019/0215152 A1* | 7/2019 | Wang | H04L 9/0894 |

FOREIGN PATENT DOCUMENTS

| | | |
|---|---|---|
| CN | 107277869 A | 10/2017 |
| CN | 107770401 A | 3/2018 |
| CN | 107888381 A | 4/2018 |
| JP | 2002-247026 A | 8/2002 |
| JP | 2016-150484 A | 8/2016 |
| JP | 2016-167803 A | 9/2016 |
| JP | 2018-032910 A | 3/2018 |
| WO | 2009/147788 A | 12/2009 |

OTHER PUBLICATIONS

Japanese Office Action dated May 16, 2022, in related Japanese Patent Application No. 2018-144030.

* cited by examiner

FIG. 6

| Service UUID | Service NAME | Characteristics UUID | CONTENT | Read | Write | ENCRYPTION | VALUE |
|---|---|---|---|---|---|---|---|
| 00000000-0000-1000-1000-00405f9b34fb | Original | 00000000-0000-2000-1000-00405f9b34fb | CONCATENATED ENCRYPTION DATA | O | – | O | (SSID + PASSWORD + ERROR INFORMATION) 601 |
| | | 00000000-0000-2000-1000-00405f9b34fd | KEY SEED | O | – | – | abcdefgh or 00000000  602 |
| | | 00000000-0000-2000-1000-00405f9b34fe | UNIQUE NAME | O | – | O | (printer)  603 |
| | | 00000000-0000-2000-1000-00405f9b34ff | COMPLETION NOTIFICATION | – | O | O | (registered)  604 |

F I G. 12

| Service UUID | Service NAME | Characteristics UUID | CONTENT | Read | Write | ENCRYPTION | VALUE | |
|---|---|---|---|---|---|---|---|---|
| 00000000-0000-1000-1000-004059b34fb | Original | 00000000-0000-2000-1000-004059b34fb | CONCATENATED ENCRYPTION DATA | O | - | O | (SSID + MAC ADDRESS) | 1201 |
| | | 00000000-0000-2000-1000-004059b34fc | CONCATENATED ENCRYPTION DATA | O | - | O | (PASSWORD + BD ADDRESS + ERROR INFORMATION) | 1202 |
| | | 00000000-0000-2000-1000-004059b34fd | KEY SEED | O | - | - | abcdefgh or 00000000 | 1203 |
| | | 00000000-0000-2000-1000-004059b34fe | UNIQUE NAME | O | - | O | (printer) | 1204 |
| | | 00000000-0000-2000-1000-004059b34ff | COMPLETION NOTIFICATION | - | O | O | (registered) | 1205 |

COMMUNICATION APPARATUS AND CONTROL METHOD

BACKGROUND OF THE INVENTION

Field of the Invention

The present invention relates to a technique for encrypting data by using a block encryption method.

Description of the Related Art

In recent years, electronic devices that have a short-range wireless communication function by using Bluetooth® have become popular. For example, in some cases, Bluetooth is used for communication between an information processing apparatus such as a smartphone and a communication apparatus such as a printer. Japanese Patent Laid-Open No. 2016-150484 discloses that an electronic device performs pairing with its communication partner in a case in which short-range wireless communication by Bluetooth is to be performed.

In recent years, along with improvements in wireless communication security, there is a demand for a more convenient encryption process.

SUMMARY OF THE INVENTION

The present invention provides a technique related to a highly convenient encryption process.

According to one aspect of the present invention, there is provided a communication apparatus comprising: a communication unit that includes a memory including a first storage area of a predetermined size in which access from another apparatus is permitted and a second storage area of the predetermined size in which access from the other apparatus is permitted; and an encryption unit configured to generate concatenated encrypted data by using a block encryption method to encrypt a plurality of pieces of data which are to be read out by the other apparatus and encrypted, wherein data different from the concatenated encrypted data is held in the second storage area, the concatenated encrypted data generated by the encryption unit is of a size not exceeding the predetermined size and is held in the first storage area, and the size of padding data included in the concatenated encrypted data is smaller than a total size of padding data generated by individually encrypting the plurality of pieces of data.

According to another aspect of the present invention, there is provided a communication apparatus comprising: a communication unit that is configured to perform communication in compliance with the Bluetooth Low Energy (BLE) standard and includes a storage area of a predetermined size in which access from another apparatus is permitted; and an encryption unit configured to generate concatenated encrypted data by using a block encryption method to encrypt a plurality of pieces of data to be read out by the other apparatus and encrypted, wherein the concatenated encrypted data generated by the encryption unit is of a size not exceeding the predetermined size and is held in the storage area, and the size of padding data included in the concatenated encrypted data is smaller than a total size of padding data generated by individually encrypting the plurality of pieces of data.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a table showing an example of GATT data;

FIG. 12 is a table showing another example of the GATT data;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(Arrangement of Communication System)

Figure 1:
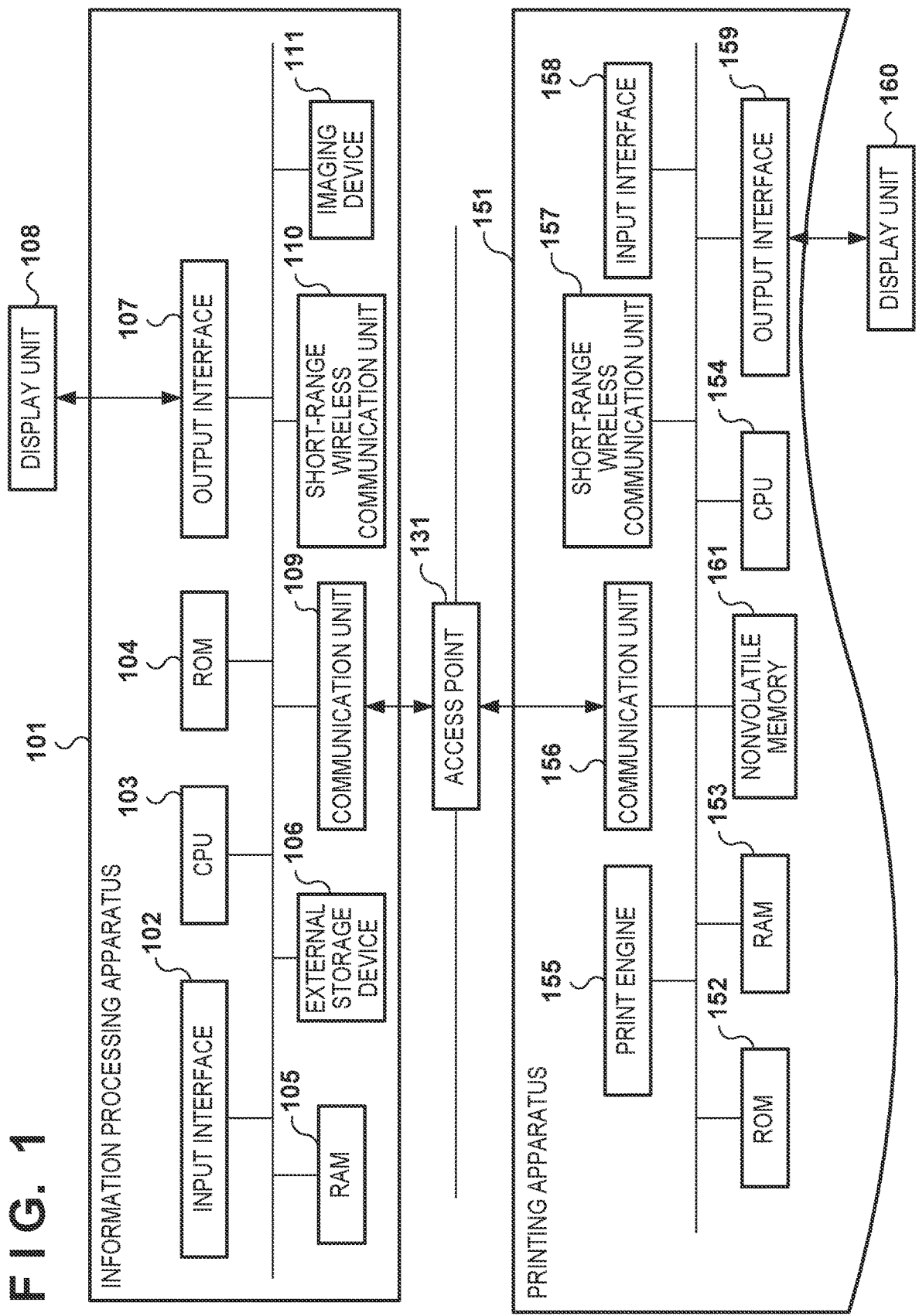
FIG. 1 is a block diagram showing the arrangement of apparatuses in a communication system.

FIG. 1 shows an example of a communication system and the arrangement of apparatuses in the system according to this embodiment. The communication system is formed by, for example, an information processing apparatus 101, an access point 131, and a communication apparatus 151. The information processing apparatus 101 is an arbitrary information processing apparatus such as, for example, a smartphone, a mobile phone, a notebook PC (personal computer), a tablet terminal, a PDA (personal digital assistant), a digital camera, or the like. Assume that the information processing apparatus 101 is a smartphone hereinafter. Also, although the communication apparatus 151 is, for example, a printer, it can also be an arbitrary electronic device if it is capable of executing wireless communication with the information processing apparatus 101. The communication apparatus 151 may be, for example, a copy machine, a facsimile device, a mobile terminal, a smartphone, a notebook PC, a tablet terminal, a PDA, a digital camera, a music playback device, a television, a smart speaker, or the like. The communication apparatus 151 may also be an MFP (multifunction printer) that has a plurality of functions such as a copy function, a FAX function, a printing function, and the like. Assume that the communication apparatus 151 will be a printer such as an inkjet printer, a full-color laser beam printer, a monochromatic printer, or the like hereinafter.

The information processing apparatus 101 includes in, one example, an input interface 102, a CPU 103, a ROM 104, a RAM 105, an external storage device 106, an output interface 107, a communication unit 109, a short-range wireless communication unit 110, and an imaging device 111. Note that these blocks are connected to each other by, for example, an internal bus. CPU, ROM, and RAM are acronyms for central processing unit, read-only memory, and random access memory, respectively. Also, although it is illustrated as if a display unit 108 (external display device) is present outside the information processing apparatus 101 in FIG. 1, the display unit 108 may be an information presenting device such as a display or the like incorporated in the information processing apparatus 101. Note that the arrangement of these blocks is merely an example, and blocks other than those shown in FIG. 1 may be included in the information processing apparatus 101. In addition, a plurality of blocks in FIG. 1 may be integrated into a single block or a single block may be divided into two or more blocks. That is, the information processing apparatus 101 can have an arbitrary arrangement within the range in which processing to be described below can be executed.

The CPU 103 is a system control unit and controls the overall information processing apparatus 101. The ROM 104 stores permanent data such as control programs, data tables, an embedded OS (operating system) program, and the like to be executed by the CPU 103. In this embodiment, each control program stored in the ROM 104 is used to perform software execution control such as scheduling, task switching, interrupt processing, and the like under the management of the embedded OS stored in the ROM 104. The RAM 105 is formed from, for example, an SRAM (static RAM) requiring a backup power supply. Note that since data is held by a primary battery for data backup (not shown), the RAM 105 can store data such as program control variables and the like without volatilizing them. A memory area that stores the setting information of the information processing apparatus 101, the management data of the information processing apparatus 101, and the like is also arranged in the RAM 105. The RAM 105 is also used as the main memory and the work memory of the CPU 103. The external storage device 106 stores an application that provides a print execution function. The external storage device 106 also stores various kinds of programs such as a print information generation program for generating print information interpretable by the communication apparatus 151, an information transmission/reception control program for exchanging information with the communication apparatus 151 which is connected via the communication unit 109, and the like. The various kinds of information to be used by these programs and image data obtained from other information processing apparatuses or the internet via the communication unit can be stored in the external storage device 106.

The input interface 102 is an interface for accepting data inputs and operation instructions from a user and is formed from a physical keyboard, buttons, and the like. The output interface 107 is an interface that performs control to cause the display unit 108 to display data and perform notification of the state of the information processing apparatus 101. The display unit 108 is formed from an LED (light emitting diode), LCD (liquid crystal display), and the like, displays data, and performs user notification processing of the state of the information processing apparatus 101. Note that the input interface 102 for accepting an operation from the user and the output interface 107 (and the display unit 108), to be described later, for screen output may be implemented by a single device such as a touch panel. For example, a software keyboard including keys such as numerical value input keys, a mode setting key, an enter key, a cancel key, and a power key may be displayed on the display unit 108 so that an input from the user can be accepted via the display unit 108. Note that the output interface 107 may perform control to cause an output unit (not shown) to present information by sound output and vibration output.

The communication unit 109 is formed from a circuit and an antenna for performing communication in accordance with a predetermined wireless communication method, connects to another apparatus such as the communication apparatus 151 which can perform communication in accordance with the same wireless communication method, and executes data communication. For example, the communication unit 109 has a function as a wireless LAN terminal, and in a case in which a communication unit 156 of the communication apparatus 151 functions as an access point, the communication unit can wirelessly connect to the access point. The establishment of a connection between the communication unit 109 and the communication unit 156 allows the information processing apparatus 101 and the communication apparatus 151 to communicate with each other. Note that when the communication unit 109 is to operate as an access point, it is possible to establish a connection by causing the communication apparatus 151 to operate as a terminal. Additionally, execution of inter-terminal communication is also possible by causing both the information processing apparatus 101 and the communication apparatus 151 to operate as terminals. Note that the communication unit 109 and the communication unit 156 may each include hardware to serve as an access point or a terminal and be formed to permanently execute each function or may have a software capability to dynamically switch between these functions. For example, although the communication unit 156 can operate as an access point, it is sufficient for the communication unit to be able to execute a function like an access point. That is, it is sufficient for the communication unit 156 to have a function to construct a network and to determine a channel to be used in the network. Note that an apparatus which is to execute a function like an access point may be referred to as a master station. On the other hand, an apparatus that participates in a network generated by the master station may be referred to as a slave station. Also, both the communication unit 109 and the communication unit 156 can operate as terminals and connect to each other via, for example, the access point 131. Note that, for example, the access point 131 is a device such as a wireless LAN router and is device that constructs a network and determines a channel to be used in the network. The communication unit 109 and the communication unit 156 may each have the capability to operate in accordance with a wireless communication method by a wireless LAN in compliance with the IEEE802.11 standard series or have the capability to operate in accordance with another wireless communication method. For example, the communication unit 109 and the communication unit 156 may each have the capability to operate in compliance with, for example, a standard such as Bluetooth® (version 3.0 or earlier in one example).

The short-range wireless communication unit 110 is a device that includes a circuit and an antenna for executing data communication by wirelessly connecting the information processing apparatus 101 to another apparatus such as the communication apparatus 151 which is present within a predetermined short range. Note that the short-range wireless communication unit 110 performs communication by a wireless communication method different from that of the communication unit 109. The short-range wireless communication unit 110 can connect to a short-range wireless communication unit 157 of the communication apparatus 151 that operates in accordance with the same wireless communication method. Assume that in this embodiment, the short-range wireless communication unit 110 and the short-range wireless communication unit 157 operate in compliance with the Bluetooth Low Energy (BLE) standard. Note that a BD address (Bluetooth device address) which is identification information unique to the device is assigned to the communication module of each Bluetooth device.

The imaging device 111 is a device that converts an image captured by an image sensor into digital data. The digital data is stored once in the RAM 105, subsequently converted into a predetermined image format based on a program executed by the CPU 103, and stored as image data in the external storage device 106.

The communication apparatus 151 includes, in one example, a ROM 152, a RAM 153, a CPU 154, a print engine 155, the communication unit 156, the short-range wireless communication unit 157, an input interface 158, an output interface 159, and a nonvolatile memory 161. Note that these blocks are connected to each other by using, for example, an internal bus. Although it is illustrated as if a display unit 160 (external display device) is present outside the communication apparatus 151 in FIG. 1, the display unit 160 may be a display incorporated in the communication apparatus 151. Note that the arrangement of these blocks is merely an example, and the communication apparatus 151 may include blocks other than those shown in FIG. 1. The plurality of blocks shown in FIG. 1 may be integrated into a single block or a single block may be divided into two or more blocks. That is, the communication apparatus 151 can have an arbitrary arrangement within the range in which the processing, which is to be described later, can be executed.

The CPU 154 is a system control unit and controls the overall communication apparatus 151. The RAM 153 is formed from, for example, a DRAM (Dynamic RAM) requiring a backup power supply, in the same manner as the RAM 105. The RAM 153 is also used as the main memory and the work memory of the CPU 154, can be used as a reception buffer for temporarily saving print information received from the information processing apparatus 101, and can be used when saving various kinds of information. Since data is held in the RAM 153 by supplying a backup power supply, important data such as program control variables and the like can be stored without volatizing them. The ROM 152 stores permanent data such as control programs and data tables, an OS program, and the like which are to be executed by the CPU 154. In this embodiment, each control program stored in the ROM 152 is used to perform software execution control such as scheduling, task switching, interrupt processing, and the like under the management of the embedded OS stored in the ROM 152. A memory area that stores data, such as the setting information of the communication apparatus 151, the management data of the communication apparatus 151, and the like, which are required to be held even when power supply is not performed can also be arranged in the ROM 152.

The communication unit 156 has the same functions as the above-described communication unit 109 and can communicate with the communication unit 109 by direct communication or indirect communication via the access point 131. The short-range wireless communication unit 157 is a device that can perform short-range wireless communication with the short-range wireless communication unit 110 by using the same wireless communication method (a communication method in compliance with the BLE standard in this embodiment) as that of the short-range wireless communication unit 110 of the information processing apparatus 101.

The print engine 155 performs, based on information stored in the RAM 153 or a print job received from the information processing apparatus 101, image formation on a print medium such as paper by using a print agent such as ink and outputs a printing result. Hence, the communication apparatus 151 can also execute print control. At this time, since a print job to be transmitted from the information processing apparatus 101 has a large amount of data to be transmitted and requires high-speed communication, it can be received via the communication unit 156 which can communicate at a higher speed than the short-range wireless communication unit 157.

The input interface 158 is an interface for accepting data inputs and operation instructions from the user and is formed from a physical keyboard, buttons, a touch panel, and the like. The output interface 159 is an interface to perform control to cause the display unit 160 to display data and perform notification of the state of the communication apparatus 151. The display unit 160 is formed from an LED (light emitting diode), LCD (liquid crystal display), and the like, displays data, and notifies the user of the state of the communication apparatus 151. Note that the input interface 158 for accepting an operation from the user and the output interface 159 (and the display unit 160), to be described later, for screen output may be implemented by a single device such as a touch panel. For example, a software keyboard including keys such as numerical value input keys, a mode setting key, an enter key, a cancel key, and a power key can be displayed on the display unit 160 so that an input from the user can be accepted via the display unit 160. Note that the output interface 159 may perform control to cause an output unit (not shown) to present information by sound output and vibration output.

The nonvolatile memory 161 is formed by a device such as an EEPROM (electrically erasable programmable read-only memory), a flash memory, or the like. The nonvolatile memory 161 is used for storing data that is required to be held, such as the setting values and the like of the communication apparatus 151, even while power is not supplied to the communication apparatus 151.

Note that a memory such as an external HDD or an SD card may be mounted to the communication apparatus 151 as an optional device, and the information saved in the communication apparatus 151 may be saved in this memory. Here, although an example of processing sharing between the information processing apparatus 101 and the communication apparatus 151 has been described above, the form of processing sharing is not particularly limited to this, and another form of processing sharing may be used.

Figure 2:
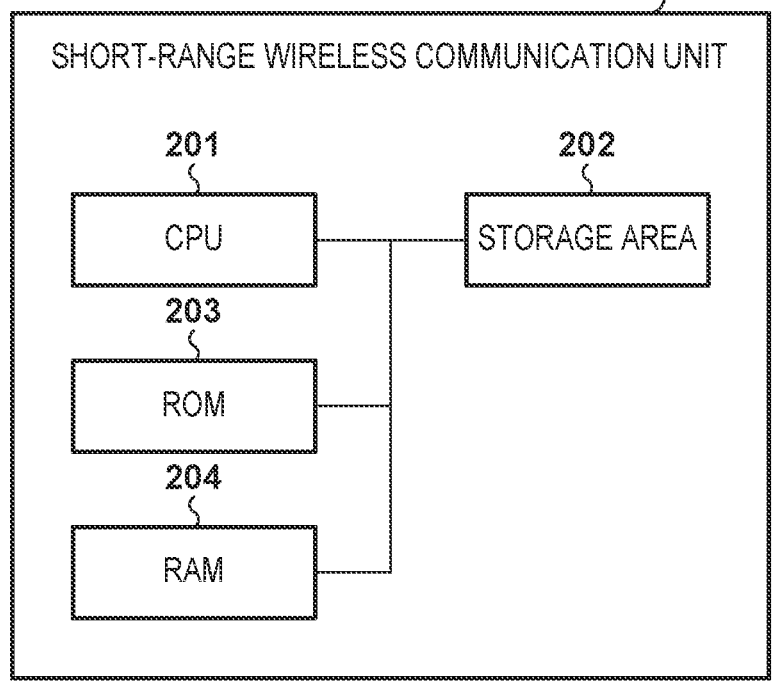
FIG. 2 is a block diagram showing an example of the arrangement of a short-range wireless communication unit.

Details of the short-range wireless communication unit 157 will be described with reference to FIG. 2. The short-range wireless communication unit 157 includes an arrangement for performing short-range wireless communication with an apparatus such as the information processing apparatus 101. In this embodiment, the short-range wireless communication unit 157 communicates by a wireless communication method in compliance with the BLE standard as described above. Note that the short-range wireless communication unit 157 and the CPU 154 can communicate with each other via a bus interface such as an I2C (Inter-Integrated Circuit), and the CPU 154 can, for example, access the storage area inside the short-range wireless communication unit 157. For example, a CPU 201, a storage area 202, a ROM 203, and a RAM 204 are included inside the short-range wireless communication unit 157. The CPU 201 controls the overall short-range wireless communication unit 157. The ROM 203 stores permanent data such as control programs and data tables which are to be executed by the CPU 201, an OS program, and the like. The RAM 204 is formed from, for example, a DRAM requiring a backup power supply and has the capability to store important data such as program control variables without volatilizing them. The RAM 204 can also be used as the main memory and the work memory of the CPU 201. The storage area 202 is an area that can store information accessible from the CPU 154 or the information processing apparatus 101 via the short-range wireless communication unit 110. Note that the storage area 202 is formed from an arbitrary device capable of storing information, and may be formed, for example, as a part of the RAM 204 or be formed, for example, by a nonvolatile memory separate from the ROM 203 and the RAM 204. Note that the communication unit 156 and the short-range wireless communication unit 157 may operate separately on different chips or operate together on a single chip.

(Outline of GATT Communication)

The outline of communication by GATT (Generic Attribute Profile) of the BLE standard will be described next. GATT defines the two roles of a GATT client and a GATT server based on the transfer source and the transfer destination of the data. The role of the GATT client is to transmit a request to the GATT server and receive a response from the GATT server. The role of the GATT server is to return a response upon receiving a request from the GATT client. In this embodiment, assume that the information processing apparatus 101 is the GATT client and the communication apparatus 151 is the GATT server. That is, the information processing apparatus 101 is the communication partner apparatus of the communication apparatus 151. Note that, the GATT server is a device that stores data or status information. The GATT client can execute data read and write to the GATT server.

Figure 3:
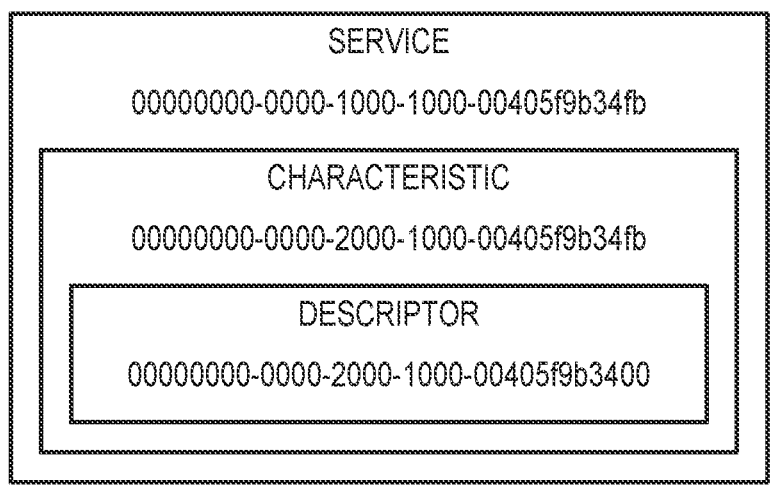
FIG. 3 is a view showing a GATT data format.

A GATT database is formed by three elements called a service, a characteristic, and a descriptor. Note that the GATT database is held in the storage area 202. FIG. 3 shows the relationship of these three elements. A service includes at least one or more characteristics, and a characteristic includes a descriptor. Among these, a characteristic is used for holding user data, and separate pieces of information can be held by using a plurality of characteristics. A descriptor holds additional information of the characteristic as needed. Note that a descriptor need not be present. Note that the size of the data that can be stored in a characteristic is predetermined.

Each of the service, the characteristic, and the descriptor can be identified by a UUID (universally unique identifier) assigned to each of these elements. The UUID is, for example, a 32-digit hexadecimal number (128 bits) which is expressed in the manner of "550e8400-e29b-41d4-a716-446655440000". The UUID is used as an identifier for uniquely identifying an object in the software. Note that a value defined by the Bluetooth SIG (Special Interest Group) standard is expressed as a four-digit value.

The service, the characteristic, and the descriptor can each set a read/write attribute and a security attribute to the GATT client. The GATT client can designate a UUID corresponding to each service and each characteristic to read/write a value held by each characteristic. However, whether the read/write operation can be executed is determined by the read/write attribute set to each service and each characteristic.

(Procedure of Processing)

The capacity of a memory mounted in, for example, a Bluetooth communication device tends to be small. Thus, the Bluetooth communication devices tend to be formed to store small amounts of information. In contrast, when each of a plurality of pieces of information to be stored in the memory of a Bluetooth communication device is individually encrypted by a block cipher such as the AES (Advanced Encryption Standard), padding data can be inserted into each piece of information. Hence, the amount of padding data can increase with respect to the encryption-target data amount in some cases, and the capacity of the memory mounted in the Bluetooth device may be consumed unnecessarily. Processing which is to be executed in consideration of this point will be described hereinafter.

An example of the procedure of processing to be executed in a communication system will be described next. In this communication system, encrypted data is transmitted from the communication apparatus 151 to the information processing apparatus 101 via the short-range wireless communication unit 157. The data to be transmitted in this case can be, for example, communication parameter data to be used by the communication unit 109 to connect to the access point 131 and the communication unit 156. In this embodiment, the communication apparatus 151 writes the transmission-target data in the storage area 202 of the short-range wireless communication unit 157 after encrypting the transmission-target data. The information processing apparatus 101 can obtain the necessary data by reading out this encrypted data and decoding the encrypted data.

Figure 4:
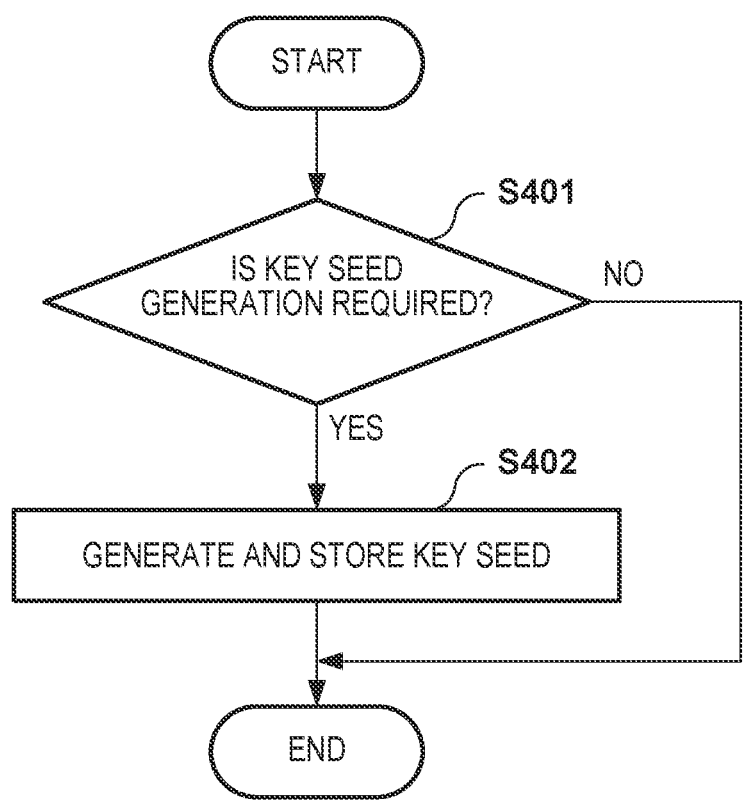
FIG. 4 is a flowchart showing an example of the procedure of processing for generating and storing a key seed.

Processing in which the communication apparatus 151 generates and stores a key seed will be described first with reference to FIG. 4. In this processing, the communication apparatus 151 first determines whether key seed generation is required (step S401). This determination is performed by, for example, causing the communication apparatus 151 to confirm whether an effective key seed value is stored in a key seed storage area of the nonvolatile memory 161. The communication apparatus 151 will determine that key seed generation is required if the effective key seed value is not stored in the nonvolatile memory 161. Also, although this determination can be executed at, for example, the activation of the communication apparatus 151, it may be executed at a timing other than this. Note that a key seed is a value to be used to generate an encryption key. In addition, an encryption key is a value to be used for encrypting data, and the encryption key is calculated by using the key seed in this embodiment. An algorithm for calculating an encryption key from a key seed can be an algorithm using, for example, a hash function. A hash function is a function in which an output value will be unique to a corresponding input value, and is a function designed so that there will be few output overlaps. Note that another algorithm may be used only in a case in which an encryption key can be generated by using a calculation method that can obtain an output value unique to an input value. Also, a key seed is generated so that discrimination between the key seed and an invalid value will be possible. For example, it may be set so that a key seed will be handled as an invalid value in a case in which the value of the key seed indicates "0", and control may be performed so this kind of invalid value will not be generated when the key seed is generated.

If it is determined that key seed generation is required (YES in step S401), the communication apparatus 151 executes key seed generation processing (step S402). Unless an invalid value is generated, the same value may be generated as the key seed at each generation processing or a random value may be generated as the key seed. The communication apparatus 151 stores the generated key seed in the nonvolatile memory 161 (step S402). On the other hand, if it is determined that the key seed generation is not required (NO in step S401), the communication apparatus 151 will end the processing of FIG. 4 without generating the key seed. Note that even in a case in which it is determined that the key seed generation is not required, the communication apparatus 151 can generate the key seed if, for example, it accepts a user operation instructing the regeneration of the key seed or the like.

Figure 5:
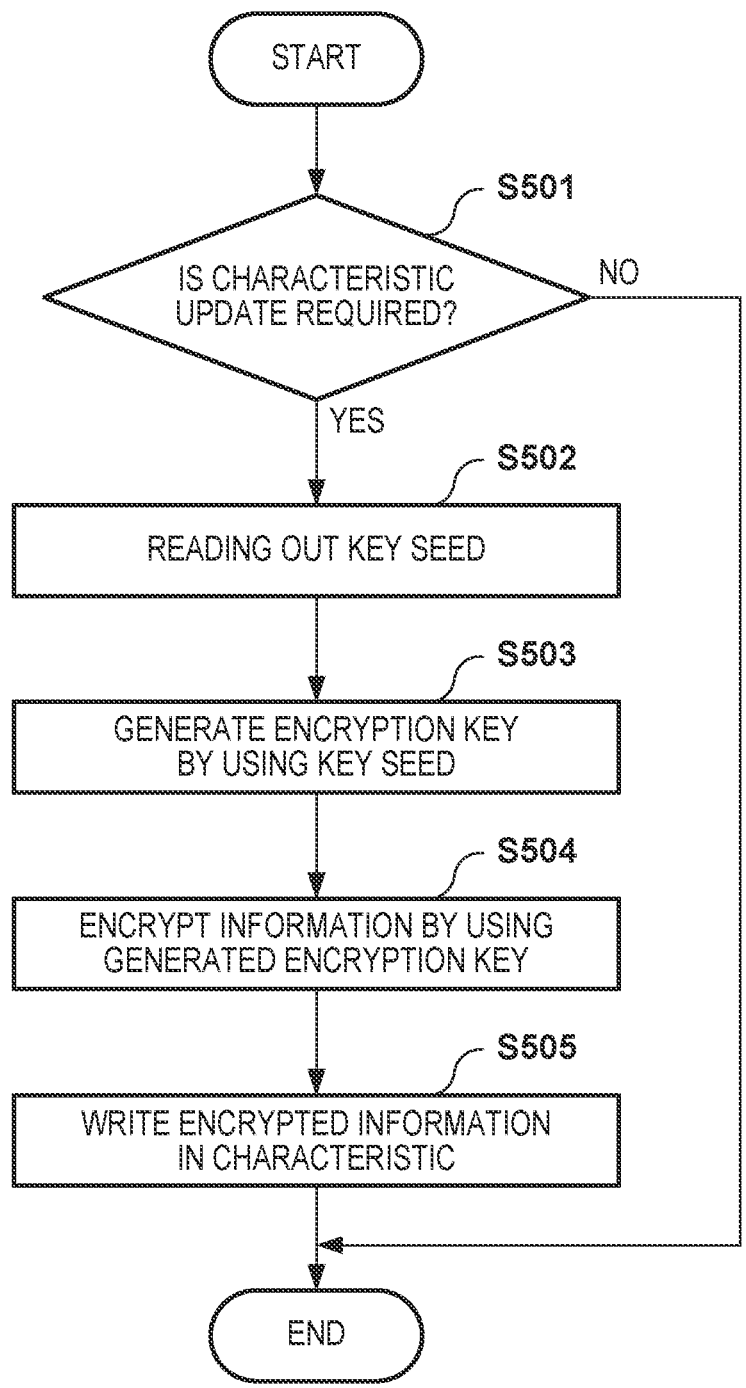
FIG. 5 is a flowchart showing an example of the procedure of processing for writing encrypted data to a characteristic.

The processing performed when the communication apparatus 151 is to encrypt a setting value stored in the RAM 153 or the nonvolatile memory 161 and write the encrypted setting value in the short-range wireless communication unit 157 will be described next with reference to FIG. 5. In this processing, first, the communication apparatus 151 determines whether a characteristic in the short-range wireless communication unit 157 needs to be updated (step S501). For example, the communication apparatus 151 will determine that the characteristic needs to be updated if the setting value stored in the RAM 153 or the nonvolatile memory 161 has been updated. Note that the updating of the setting value is performed by a user instruction input via, for example, the display unit 160 of the communication apparatus 151. In this embodiment, an SSID and a password are encrypted in the manner to be described later as an example. Hence, for example, in a case in which a user has changed, via the display unit 160 of the communication apparatus 151, at least one of a password and an SSID of a network constructed by the communication unit 156, the communication apparatus 151 will determine "YES" in step S501. In addition, in a case in which the user has changed, via the display unit 160 of the communication apparatus 151, an external access point used by the communication unit 156, the SSID and the like to be used for infrastructure connection will be changed. Thus, the communication apparatus 151 will determine "YES" in step S501. Furthermore, the communication apparatus 151 may initialize the characteristic of the short-range wireless communication unit 157 at the activation of the self-apparatus, and may update the value of the characteristic regardless of the setting value.

An example of the structure of the database included as a GATT server in the short-range wireless communication unit 157 of the communication apparatus 151 will be described with reference to FIG. 6. Four characteristics 601 to 604 are included in a unique service name "Original" (service UUID: 00000000-0000-1000-1000-00405f9b34fb) of a vender. The four characteristics each hold "concatenated encrypted data", "a key seed", "a unique name", and "a completion notification". A separate characteristic UUID is assigned to each of these characteristics. In addition, whether encryption is to be performed on the read attribute, the write attribute, and the data to be stored is set for each of these characteristics. In FIG. 6, the readout of a characteristic is permitted when "○" is indicated in the "Read" portion of the characteristic, and writing of a characteristic is permitted when "○" is indicated in the "Write" portion of the characteristic. In the same manner, in FIG. 6, each characteristic in which "○" is indicated in the "Encryption" portion of in the characteristic holds data that has been encrypted by using an encryption key calculated from a key seed provided by the characteristic 602.

Some of the contents of the characteristics shown in FIG. 6 will be described in more detail. The characteristic 601 holds information for another apparatus to connect to a network that has been constructed by the communication unit 156 in a case in which the communication unit 156 of the communication apparatus 151 is operating as an access point. For example, the SSID (service set identifier) of the access point, the password, the error information of the communication apparatus 151, and the like are stored in the characteristic 601. Note that the SSID is an identifier for identifying an access point itself or a network generated by the access point. The SSID, the password, and the error information are stored in a concatenated and encrypted state. The characteristic 603 holds a character string indicating "printer" which is a unique name of the communication apparatus 151 stored in an encrypted state. These pieces of encrypted information can be handled as highly confidential information. Note that the database included by the short-range wireless communication unit 157 as a GATT server described in FIG. 6 is merely an example and is not limited to this example. For example, an arbitrary item can be added as a characteristic.

Figure 7:
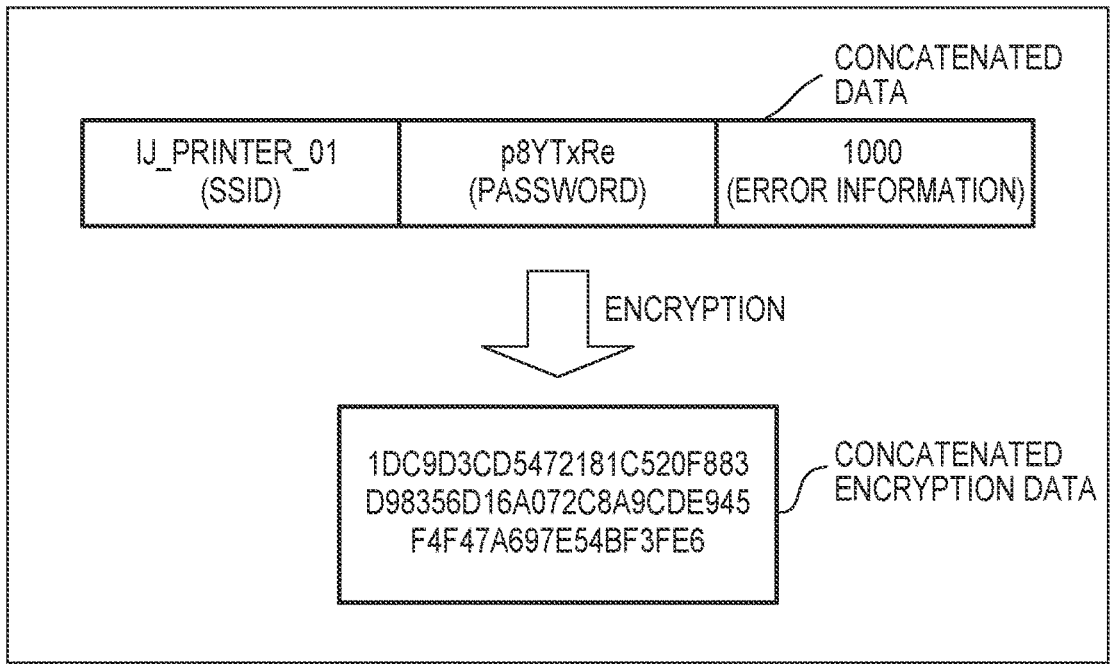
FIG. 7 is a view for schematically explaining processing for generating encrypted data.

Returning to FIG. 5, if it is determined that a characteristic of the short-range wireless communication unit 157 need not be updated (NO in step S501), the communication apparatus 151 ends the processing of FIG. 5. On the other hand, if it is determined that a characteristic of the short-range wireless communication unit 157 needs to be updated (YES in step S501), the communication apparatus 151 reads out a key seed value generated in step S402 and stored in the RAM 153 or the nonvolatile memory 161 (step S502). Subsequently, the communication apparatus 151 generates an encryption key by using the key seed read out in step S502 (step S503). Note that this embodiment uses a symmetric-key encryption method in which an encryption algorithm that uses the same key as the encryption key used for encrypting information and the decoding key used for decoding the encrypted data is used. Note that although it is assumed that AES, which is a type of a symmetric-key encryption method, is used particularly in this embodiment, the present invention is not limited to this method, and another encryption algorithm may be used. The communication apparatus 151 reads out the SSID, the password, and the error information stored in the RAM 153 or the nonvolatile memory 161, and concatenates and encrypts these data (step S504). Data concatenation and encryption will be described with reference to FIG. 7. As shown in FIG. 7, the three sets of data, that is, the SSID ("IJ_PRINTER_01"), the password ("p8YTxRe"), and the error information ("1000") which have been read out, are concatenated and a single set of concatenated data is generated. This concatenated data is encrypted collectively, and one set of concatenated encrypted data corresponding to the one set of the concatenated data obtained by connecting these three sets of data is obtained. Note that the concatenated data shown in FIG. 7 is merely an example, and a plurality of pieces of data can be concatenated arbitrarily. Note that the term "concatenate" used here indicates that another set of data is connected so as to follow one set of data. The data size of the concatenated encrypted data is smaller than or equal to the data size that can be stored in one characteristic. Here, assume, for example, a case in which only one type of data (for example, only the SSID) is encrypted and stored with respect to one characteristic in accordance with a block encryption method. Note that the data size of the SSID is not equal to an integer multiple of the block size of the block encryption method. In this case, the remainder obtained when the data size of the SSID is divided by the block size needs to be filled. The data used to fill this remainder is padding data. The encrypted data generated by encrypting the SSID is stored in one characteristic. The data size of the encrypted data to be stored in one characteristic corresponds to the sum of the data size of the SSID and the padding data. That is, depending on the situation, there is a possibility that the substantial data to be included in the encrypted data stored in one characteristic will be small and that the remaining portion will be largely padding data. If storage processing as described above is performed on a data basis, it may become difficult to store necessary data in the storage area 202 of the short-range wireless communication unit 157.

On the other hand, as described above in step S504, in this embodiment, a plurality of pieces of data are concatenated so that the size of the concatenated data, obtained by concatenating the plurality of pieces of data, will be close to an integer multiple of the block size. In addition, the concatenated data is generated so that it will be equal to or less than the data size storable in a characteristic. By generating concatenated data in this manner, the size of padding data included in the concatenated encrypted data generated by executing this embodiment can be reduced more than the total size of the padding data generated by individually encrypting the plurality of pieces of data. That is, this embodiment can suppress the size of the encrypted data obtained by using a block cipher.

Note that, although the SSID, the password, and the error information of the communication apparatus 151 required for the information processing apparatus 101 to directly communicate with the communication unit 109 of the communication apparatus 151 are read out from the RAM 153 or the nonvolatile memory 161 in this embodiment, the present invention is not limited to this. For example, the SSID, the password, and the like for connecting to the external access point 131 may be read out. The target to be encrypted in step S504 need not be the setting value required for the updating process in step S501. Also, in this embodiment, the plurality of pieces of data which are to be concatenated as the encryption target can be dynamically determined in accordance with the size of the padding data at the time of the encryption which is determined in accordance with the difference between the block size of the block encryption method and the full length of sizes of these plurality of pieces of data. For example, the concatenated data can be determined so that the padding data size will be minimal. The concatenated data may be selected so that the padding data size will be smaller than a predetermined amount. In this case, if the padding data size is smaller than a predetermined amount in a plurality of combinations, one of the plurality of combinations can be selected, for example, randomly or based on a predetermined reference such a combination with the smallest padding data size or the like. Also, in a case in which the padding data size is not smaller than the predetermined amount in any of the data combinations, encryption can be performed by, for example, selecting a data combination whose padding data size will be minimal or without performing the concatenation. Also, in a case in which the padding data size obtained by concatenating data of a first combination is smaller than the padding data size obtained by concatenating data of a second combination, encryption will be performed by concatenating the data of the first combination. That is, even if the padding data size is not minimal, a combination which will result in a relatively small padding data size can be selected as the concatenation target. In addition, for example, when determining whether to concatenate a plurality of pieces of data, it may be set so that the data will be concatenated if the padding data size will become smaller by concatenating the data and that the data will not be concatenated if the padding data size will not become smaller. In a method of determining concatenated data in correspondence with the padding data size, the concatenated data is selected so that the size of the concatenated data will be a size close to an integer multiple of a cipher block size (16 bytes in the case of AES). Although the cipher block size is 16 bytes in the case of AES, a block encryption method which has a block size other than 16 bytes such as 32 bytes may be used. In this case, the concatenation target data are selected based on the size of the concatenated data and the block size. Note that when concatenating data, a value that will serve as a data delimiter may be inserted between data which are to be concatenated.

Returning to FIG. 5, the communication apparatus 151 writes the concatenated encrypted data encrypted in step S504 in the characteristic 601 (the characteristic which is to hold the concatenated encrypted data) of the short-range wireless communication unit 157 (step S505). Using such concatenated encrypted data allows data to be stored at a smaller capacity than a case in which the SSID, the password, and the error information are individually encrypted and stored in the characteristic. Note that the communication apparatus 151 may read out each value that need not be encrypted from the RAM 153 or the nonvolatile memory 161 at this timing, and write the value in a corresponding characteristic of the short-range wireless communication unit 157.

The processing described above is repetitively executed for all of the values which are to be stored in each characteristic in which "○" is indicated in the "Read" portion and the "Encryption" portion in FIG. 6. That is, in FIG. 6, every value to be stored in each characteristic which has "○" indicated in the "Read" portion and the "Encryption" portion is read out from the RAM 153 or the nonvolatile memory 161 and becomes an encrypted value.

Note that although it was described above that an encryption key will be generated in steps S502 and S503 if it is determined that updating of the characteristic is necessary in step S501, this processing may be omitted if the encryption key is not to be changed from the time of the previous characteristic updating operation. That is, it may be set so that the encryption key will be generated only in a case in which the key seed has been initialized when it is determined that updating of the characteristic is necessary in step S501.

Figure 8:
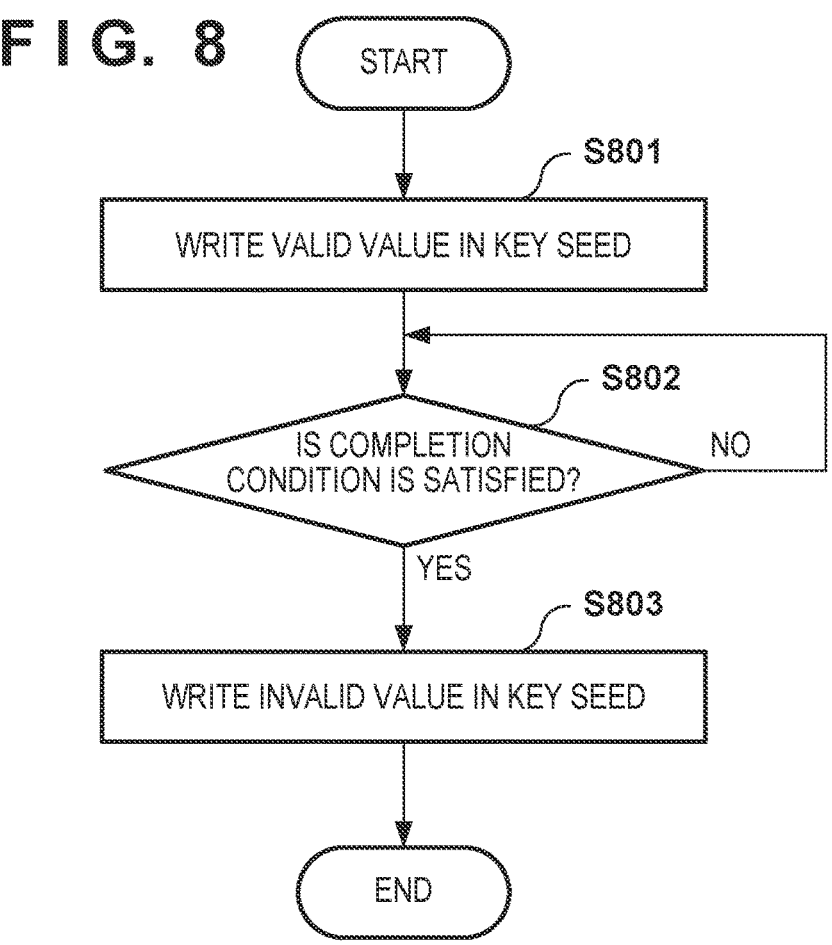
FIG. 8 is a flowchart showing an example of the procedure of processing for setting the disclosure/non-disclosure of the key seed.

An example of the procedure of processing which is executed by the communication apparatus 151 to set the disclosure/non-disclosure of the key seed will be described next with reference to FIG. 8. The communication apparatus 151 can be formed to be capable of making a disclosure/non-disclosure setting of the key seed by accepting a specific key operation by the user via the input interface 158. In this embodiment, the value of the key seed will be set as an invalid value in a state in which the key seed is to be undisclosed, and a value of the key seed will be set as a valid value in a state in which the key seed is to be disclosed. In this processing, upon accepting the specific key operation made by the user, the communication apparatus 151 will write the value of a key seed generated by the method shown in step S402 in the characteristic 602 which is to store the key seed (step S801). The communication apparatus 151 will maintain a state in which the key seed is disclosed until a predetermined completion condition is satisfied (while NO is indicated in step S802), and will rewrite the value of the key seed as an invalid value and shift the key seed to an undisclosed state (step S803) when the predetermined completion condition is satisfied (YES in step S802). The predetermined completion condition in this case can be, for example, a state in the communication apparatus 151 receives a notification of that it has been registered in the information processing apparatus 101 by performing GATT communication with the information processing apparatus 101. Note that the method of setting the key seed in the undisclosed state may be performed, other than by storing an invalid value, by setting the characteristic storing the key seed in the database in an unreadable state. By performing such control, it is possible to prevent the key seed from being read by a user other than a valid user who is permitted to make a specific operation on the apparatus.

The procedure of printer registration processing executed by the information processing apparatus 101 will be described next with reference to FIG. 9. Assume that the communication apparatus 151 will be discovered as a new registration target printer hereinafter. Upon starting the printer registration processing via an application, the information processing apparatus 101 receives the advertising information from the BLE advertisements and the scan responses from printers in the periphery by using the short-range wireless communication unit 110 (step S901). Subsequently, in a case in which the transmission source printer (the communication apparatus 151) of the received advertising information is a printer that can be supported by the application and is unregistered, the information processing apparatus 101 displays the information of this printer as printer information that can be newly registered (step S902). Note that in a case in which a plurality of display target printers are discovered in step S902, the information processing apparatus 101 will display the pieces of printer information related to this plurality of printers and cause the user to select a printer to be registered (not shown).

Next, the information processing apparatus 101 performs BLE connection by transmitting, via the short-range wireless communication unit 110, a connection request to the printer (the communication apparatus 151) selected by the user (step S903). Note that the application of the information processing apparatus 101 has, by prior arrangement, knowledge of the configuration of the characteristics of a unique service of a vendor included in the communication apparatus 151 described in FIG. 6. In addition, for example, assume that this application also has the knowledge of the value of the unique name before the encryption held in the characteristic 603 due to registration by the user or the like, and that this application also stores the value indicating the completion notification which is to be written in the characteristic 604.

After the BLE connection is established, the information processing apparatus 101 reads the predetermined characteristic 602 which stores the key seed of the communication apparatus 151, and obtains the value held in this characteristic 602 (step S904). The information processing apparatus 101 determines whether it is a state in which the key seed is disclosed by the communication apparatus 151, based whether the read value is a valid value or whether it was possible to perform the reading operation (step S905). If the value of the read key seed is an invalid value or if the reading operation could not be performed in step S904, the information processing apparatus 101 will determine that the key seed is in an undisclosed state (NO in step S905). If the state in which the key seed is undisclosed by the communication apparatus 151 is determined (NO in step S905), the information processing apparatus 101 will stand by for a predetermined time until the state changes to a state in which the key seed is disclosed (step S906). Note that the information processing apparatus 101 may display, via the display unit 108 or the like, a message to prompt the user to change the communication apparatus 151 into a key-seed disclosed state at this time. Note that the information processing apparatus 101 can end the processing of FIG. 9 in a case in which the state does not change to the key-seed disclosed state after standing by for a predetermined time or in a case in which a cancel instruction is received from the user.

On the other hand, if the state in which the key seed is disclosed by the communication apparatus 151 is determined (YES in step S905), the information processing apparatus 101 will generate a decoding key based on the read key seed in the same manner as that described above in FIG. 5 (step S907). Next, the information processing apparatus 101 obtains the unique name information of the communication apparatus 151 by reading the characteristic 603 which holds the unique name (step S908). In this embodiment, as shown in FIG. 6, a character string of the unique name called "printer" is stored in an encrypted state and is in a readable state in the characteristic 603 in the GATT data base of the communication apparatus 151. The information processing apparatus 101 obtains this encrypted unique name information, decodes this encrypted information by using the decoding key generated in step S907, and obtains "printer" as the unique name information of the communication apparatus 151.

Subsequently, the information processing apparatus 101 determines (step S909) whether the decoding key is a normal value based on whether "printer" as the unique name information obtained and decoded in step S908 matches the unique name information stored in advance. That is, the information processing apparatus 101 will determine that the decoding key is a normal value if the obtained unique name information matches the unique name information stored in advance (YES in step S909). If it is determined that the decoding key is normal (YES in step S909), the information processing apparatus 101 performs registration processing of this printer by storing an identifier such as the BD address of the printer selected in step S902 and the key seed in association with each other (step S910). The information processing apparatus 101 will register a value indicating a completion notification in the characteristic 604 of the communication apparatus 151 when the printer registration processing has been completed normally. In this case, for example, a value obtained by encrypting "registered", which is a specific character string indicating the completion of the registration, by using a symmetric-key encryption method will be written in the characteristic 604 of the communication apparatus 151 by using GATT communication. The communication apparatus 151 will be able to confirm that the registration processing has been completed normally in the information processing apparatus 101 when a predetermined value ("registered") is encrypted by using the designated key seed and written in the characteristic 604.

Figure 9:
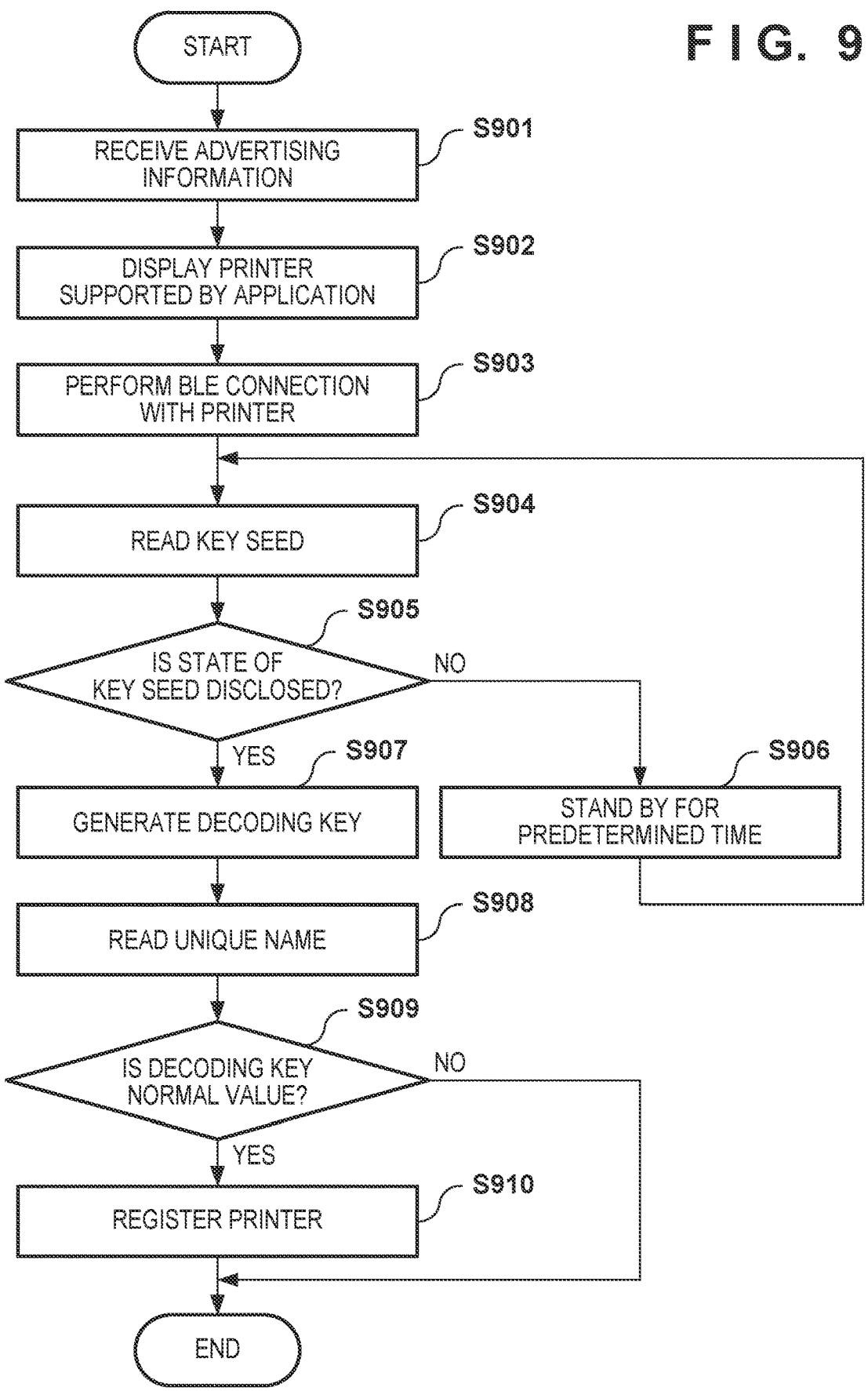
FIG. 9 is a flowchart showing an example of the procedure of printer registration processing.

After the completion of the printer registration, the information processing apparatus 101 ends the processing of FIG. 9. The information processing apparatus 101 will also end the processing of FIG. 9 without registering the printer if it is determined that the decoding key is not a normal value (NO in step S909).

Figure 10:
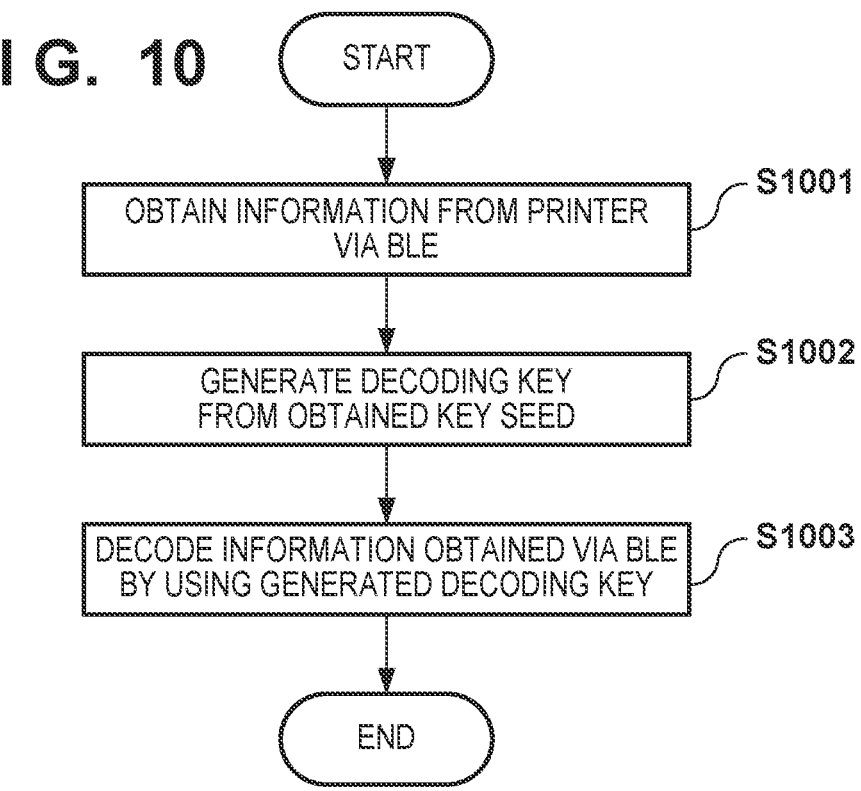
FIG. 10 is a flowchart showing an example of processing for obtaining information via BLE.

An example of processing executed by the information processing apparatus 101 to obtain information from the communication apparatus 151 (printer) via BLE will be described next with reference to FIG. 10. Note that, for example, this processing is executed in a case in which the information processing apparatus 101 is in a state already connected to the communication apparatus 151 via BLE by performing the process described above in step S903 and in a state in which the communication apparatus 151 has been already registered by performing the process described above in step S910.

Figure 11:
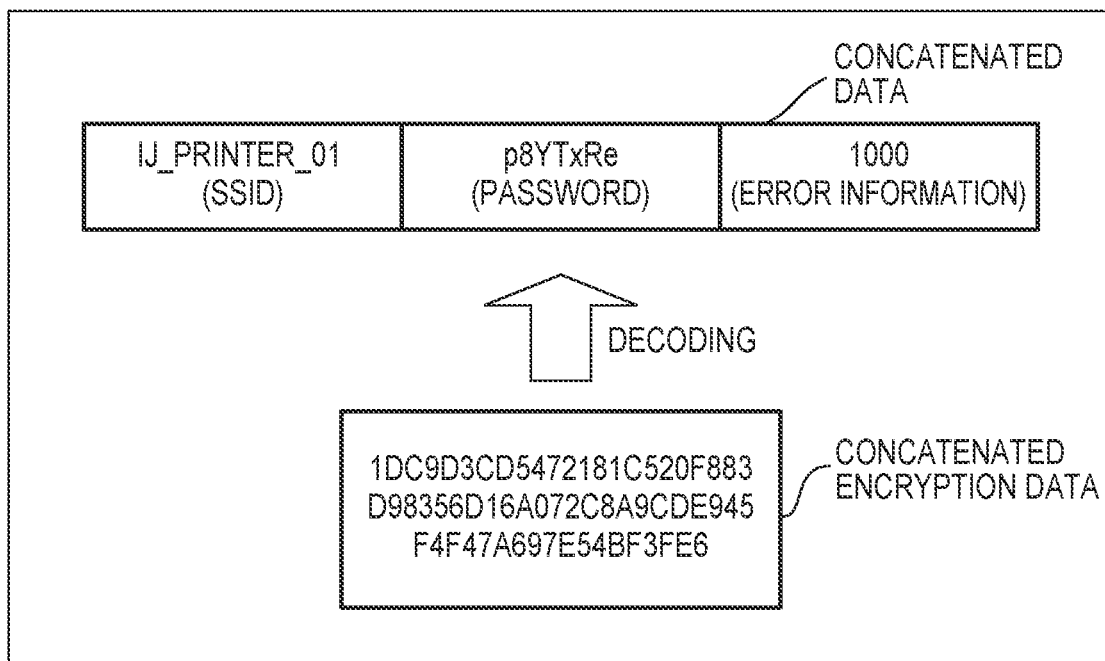
FIG. 11 is a view for schematically explaining processing for decoding concatenated encrypted data.

The information processing apparatus 101 makes an information obtainment request to the communication apparatus 151 by performing GATT communication via the short-range wireless communication unit 110 (step S1001). Among the pieces of information shown in FIG. 6, the information requested for obtainment in this case is information (for example, concatenated encrypted data) held in a characteristic (the characteristic 601) in which "○" is indicated in the "Encryption" portion and is information that has been encrypted by the process of step S504 described above. Next, the information processing apparatus 101 generates a decoding key for decoding the encrypted information from the key seed obtained in step S904 described above (step S1002). Note that the decoding key generation processing is processing similar to that of step S503 or step S907 described above. Note that in a case in which the decoding key has been generated and held by the process performed in step S907 and if this decoding key is to be used to perform data decoding in the subsequent step S1003, the process of step S1002 may be omitted. Note that although similar processing operations are performed in the calculation processing of the encryption key and in the calculation processing of the decoding key since symmetric-key encryption method is used in this embodiment, the calculation processing operations of these keys can be different from each other if another encryption method is to be used. Subsequently, the information processing apparatus 101 decodes the information obtained in step S1001 by using the decoding key generated in step S1002 (step S1003). The state of this decoding process is schematically shown in FIG. 11. As shown in FIG. 11, processing which is the reverse of the processing of FIG. 7 is performed in the decoding process, and concatenated data in which the SSID, the password, and the error information are concatenated is generated from the concatenated encrypted data obtained from, for example, the characteristic 601. In a case in which the communication unit 156 of the communication apparatus 151 is to operate as an access point, the information processing apparatus 101 can obtain the SSID and the password to connect to this access point from the concatenated data obtained by the decoding process. The information processing apparatus 101 can identify the SSID and the password based on a predetermined delimiting character or the data size.

By executing this decoding process, the information processing apparatus 101 can obtain encrypted information from the communication apparatus 151 without executing a BLE-standard pairing operation, and use the information obtained from the communication apparatus 151. The information processing apparatus 101 can also transmit encrypted data to the communication apparatus 151 without executing the BLE-standard pairing operation, and the communication apparatus 151 can use the received information. The communication apparatus 151 also generates concatenated data so that the size of the padding data will be minimal or sufficiently small. The communication apparatus 151 can also encrypt this concatenated data to store the encrypted data in the short-range wireless communication unit 157 of the communication apparatus 151 which has a small storage capacity. The information processing apparatus 101 can also use the information obtained from the communication apparatus 151 to establish a Wi-Fi connection with the communication apparatus 151. The Wi-Fi connection to be established here will be described. In a case in which the information obtained by the information processing apparatus 101 is information related to a network constructed by the communication unit 156, the communication unit 109 of the information processing apparatus 101 establishes a direct connection with the communication unit 156. A direct connection is a connection method which does not use an external access point such as the access point 131. On the other hand, in a case in which the information obtained by the information processing apparatus 101 is information related to the network constructed by the access point 131, the communication unit 109 establishes an infrastructure connection with the communication unit 156 via the access point 131. The information processing apparatus 101 can transmit a print job to the communication apparatus 151 or obtain scan data from the communication apparatus 151 via the Wi-Fi connection (the direction connection or the infrastructure connection) established through these processes. The communication apparatus 151 executes print processing based on the print job obtained via the Wi-Fi connection. The communication apparatus 151 also transmits the scan data via the Wi-Fi connection.

Note than an example in which concatenated encrypted data obtained by reading out and encrypting the SSID, the password, and the error information stored in the RAM 153 or the nonvolatile memory 161 is held in a characteristic described above. However, these pieces of information are merely examples, and information other than these pieces of information may be concatenated, encrypted, and held in the characteristic. For example, a MAC address of the communication unit 156 or the BD address indicating the hardware address of the short-range wireless communication unit 157 may be stored. An example of this case will be described with reference to FIGS. 12 to 14.

FIG. 12 shows an example of the structure of a database held by the short-range wireless communication unit 157, as a GATT server, of the communication apparatus 151 in this case. In the example shown in FIG. 12, five characteristics 1201 to 1205 are included under "Original" which is a unique service name of a vendor. Compared with the example of FIG. 6, there is an additional characteristic of concatenated encrypted data. Note that since "UUID", "Read", "Write" and "Encryption" are items similar to those shown in FIG. 6, a description will be omitted. The SSID for connecting to the communication unit 156 as an access point and the MAC address of the communication unit 156 are stored in a concatenated and encrypted state in the characteristic 1201 of the first concatenated encrypted data. The password for connecting to the communication unit 156 as the access point, the BD address of the short-range wireless communication unit 157, and the error information of the communication apparatus 151 are stored in a concatenated and encrypted state in the characteristic 1202 of the second concatenated encrypted data. Note that the SSID and the password may be pieces of information used to connect to the external access point 131, and the MAC address can be the MAC address of the access point 131 in such a case.

Figure 13:
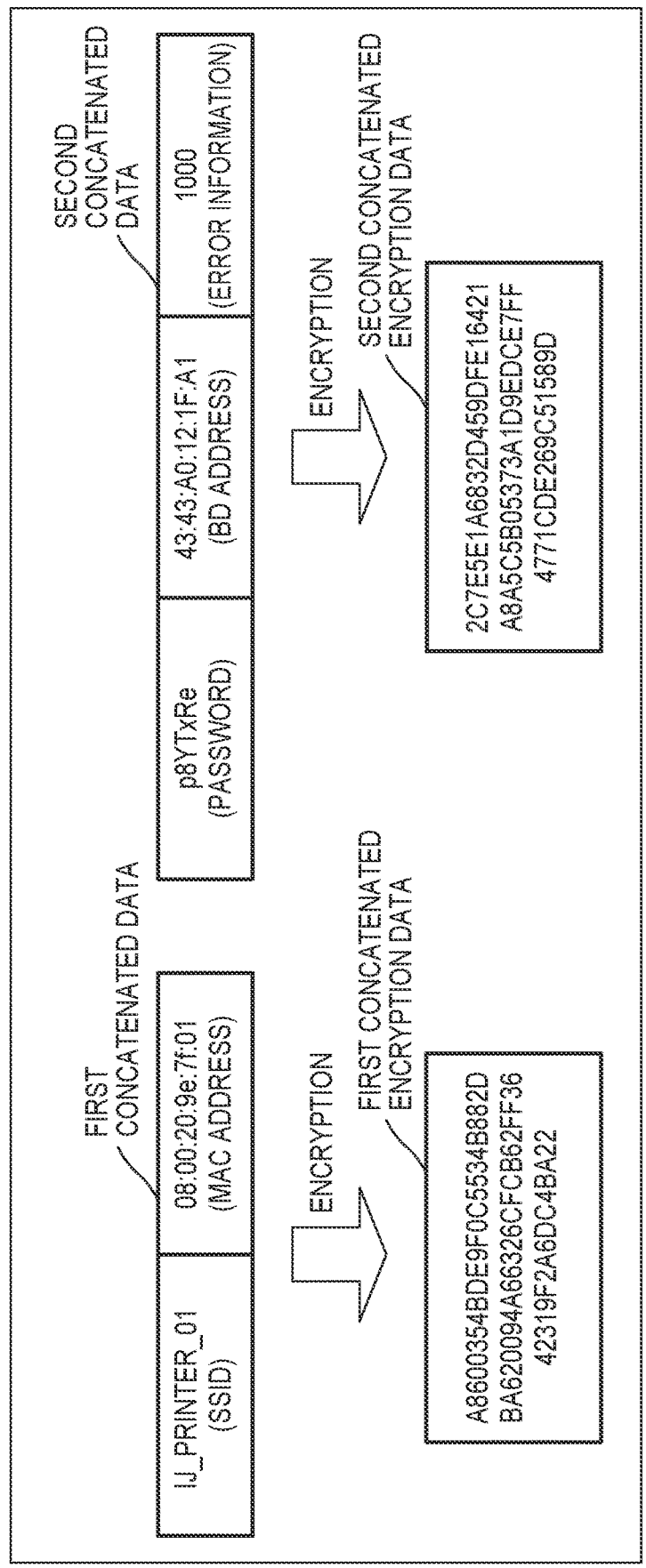
FIG. 13 is a view for schematically explaining processing for generating encrypted data.

The communication apparatus 151 reads out, in addition to the SSID, the password, and the error information of the communication apparatus 151, the MAC address of the communication unit 156 and the BD address of the short-range wireless communication unit 157 in step S504 described above. The communication apparatus 151 generates, for example, first concatenated data by concatenating the SSID and the MAC address described above, and generates second concatenated data by concatenating the password, the BD address, and the error information as described above in the manner of FIG. 13. Subsequently, as shown in FIG. 13, the communication apparatus 151 encrypts each of the first concatenated data and the second concatenated data by using the encryption key generated in step S503, thereby generating the first concatenated encrypted data and the second concatenated encrypted data. Note that, at this time, the concatenation target data can be selected so as to reduce the size of the padding data at the time of encryption. In this example, each concatenation target data can be selected so that the total amount of the padding data size related to the first concatenated data and the padding data size related to the second concatenated data will become minimal or sufficiently small. For example, although the first concatenated data is generated by concatenating the SSID and the MAC address in the example shown in FIG. 13, the present invention is not limited to this. For example, if the total padding data size will become smaller by concatenating the SSID, the password, and the error information and concatenating the MAC address and the BD address in the manner shown in FIG. 7, it can be determined that the SSID, the password, and the error information are to be concatenated. Note that a combination other than these combinations may be used. Also, three or more concatenated data can be generated separately. In addition, for example, the MAC address and the BD address may be encrypted without being concatenated with another piece of information. Furthermore, the pieces of information read out in this embodiment are merely examples, and data other than these pieces of information may be concatenated and encrypted.

In step S505, the communication apparatus 151 writes the first concatenated encrypted data and the second concatenated encrypted data, generated in step S504, in the characteristic 1201 and the characteristic 1202, respectively, of the short-range wireless communication unit 157. As a result, the data can be stored in each characteristic at a smaller amount than when encryption data is generated individually and stored for each of the SSID, the password, the MAC address, the BD address, and the error information.

Figure 14:
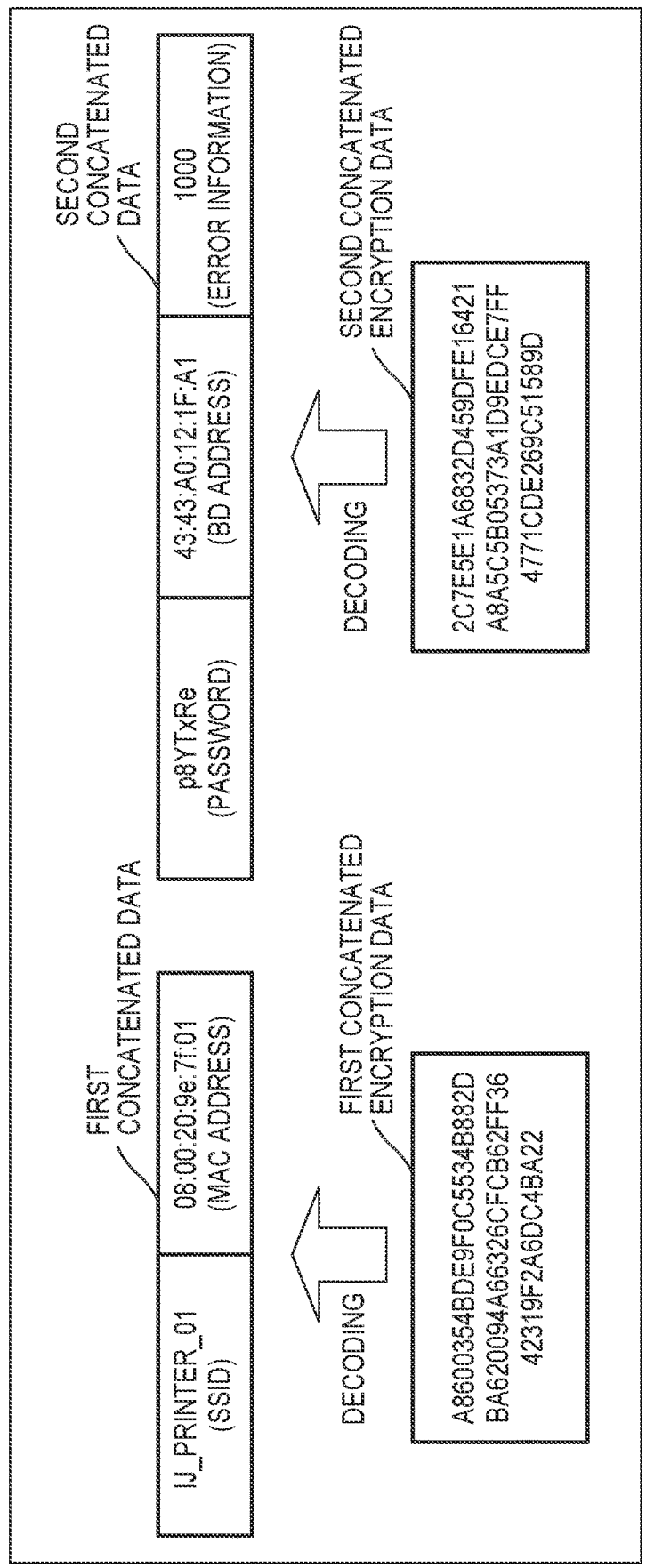
FIG. 14 is a view for schematically explaining processing for decoding concatenated encrypted data.

On the other hand, the information processing apparatus 101 decodes, in step S1003, the information obtained in step S1001 by using the decoding key generated in step S1002. The decoding process performed at this time is schematically shown in FIG. 14. The processing of FIG. 14 is the reverse of the processing shown in FIG. 13. That is, the information processing apparatus 101 decodes each of the first concatenated encrypted data and the second concatenated encrypted data, and generates the first concatenated data and the second concatenated data from the respective decoding results. The information processing apparatus 101 can obtain, from the first concatenated data and the second concatenated data, the SSID and the password to be used for connecting to the communication unit 156 of the communication apparatus 151 operating as the access point. Subsequently, the information processing apparatus 101 establishes a Wi-Fi connection by using the SSID and the password obtained from the first concatenated data and the second concatenated data.

The above embodiment described the processing in which the information processing apparatus 101 obtains encrypted information from the communication apparatus 151 by using BLE. However, the information processing apparatus 101 may also use short-range wireless communication other than BLE such as NFC (near field communication) or the like when encrypted information is to be obtained from the communication apparatus 151.

In addition, although the above embodiment showed an example in which concatenated encrypted data is generated to reduce the amount of data to be held in a characteristic, it is obvious that size reduction of encrypted data by data concatenation is applicable to purposes other than this.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-144030, filed Jul. 31, 2018 which is hereby incorporated by reference herein in its entirety.

What is claimed is:

1. A communication apparatus comprising:
   a communication unit that includes a memory including a first storage area of a predetermined size in which access from another apparatus is permitted and a second storage area of the predetermined size in which access from the other apparatus is permitted; and
   an encryption unit that includes a memory configured to generate concatenated encrypted data by using a block encryption method to encrypt a plurality of pieces of data which are to be read out by the other apparatus and encrypted,
   wherein data different from the concatenated encrypted data is held in the second storage area,
   the concatenated encrypted data generated by the encryption unit is of a size not exceeding the predetermined size and is held in the first storage area, and
   the size of padding data included in the concatenated encrypted data is smaller than a total size of padding data generated by individually encrypting the plurality of pieces of data.

2. The apparatus according to claim 1, wherein the communication unit operates in compliance with a Bluetooth Low Energy (BLE) standard.

3. The apparatus according to claim 2, wherein the first storage area corresponds to a characteristic of a database of a Generic Attribute Profile according to the BLE standard, and the concatenated encrypted data is held in the characteristic.

4. The apparatus according to claim 2, wherein an information processing apparatus which is to be a communication partner of the communication apparatus via the communication unit reads out the concatenated encrypted data held in the first storage area and second concatenated encrypted data held in the second storage area, and establishes a wireless connection with the communication apparatus based on decoding results obtained by decoding the concatenated encrypted data and the second concatenated encrypted data that have been read out.

5. The apparatus according to claim 1, further comprising:
a selection unit that includes a memory configured to select, among data combinations that the plurality of pieces of data can take, at least one combination based on the size of concatenated data in a case in which the data combinations have been concatenated and on a block size used in the block encryption method.

6. The apparatus according to claim 5, wherein in a case in which the size of padding data determined based on the size of a difference between the size of first concatenated data of a first data combination and the block size is smaller than the size of the padding data determined based on the size of a difference between the block size and the size of second concatenated data of a second data combination, the selection unit selects the first data combination as one of the at least one combination.

7. The apparatus according to claim 5, wherein the selection unit selects, as one of the at least one combination, a data combination in which the size of padding data determined based on the size of a difference between the block size and the size of the concatenated data for each data combination is minimal.

8. The apparatus according to claim 5, wherein the selection unit selects, as one of the at least one combination, a data combination in which the size of padding data determined based on the size of a difference between the block size and the size of the concatenated data for each data combination is smaller than a predetermined amount.

9. The apparatus according to claim 1, further comprising:
a second communication unit that includes a memory and is different from the communication unit and also configured to communication with the other apparatus,
wherein the plurality of pieces of data include information used for communication by the second communication unit.

10. The apparatus according to claim 9, wherein the information used for the communication by the second communication unit includes an identifier of a network generated by the second communication unit.

11. The apparatus according to claim 9, wherein the second communication unit operates in compliance with an IEEE802.11 standard series.

12. The apparatus according to claim 9, further comprising:
a printing control unit that includes a memory configured to execute print processing based on a print job received via the second communication unit.

13. A communication apparatus comprising:
a communication unit that includes a memory and is configured to perform communication in compliance with the Bluetooth Low Energy (BLE) standard and also includes a storage area of a predetermined size in which access from another apparatus is permitted; and
an encryption unit that includes a memory configured to generate concatenated encrypted data by using a block encryption method to encrypt a plurality of pieces of data to be read out by the other apparatus and encrypted,
wherein the concatenated encrypted data generated by the encryption unit is of a size not exceeding the predetermined size and is held in the storage area, and
the size of padding data included in the concatenated encrypted data is smaller than a total size of padding data generated by individually encrypting the plurality of pieces of data.

14. The apparatus according to claim 13, further comprising:
a selection unit that includes a memory configured to select, among data combinations that the plurality of pieces of data can take, at least one combination based on the size of concatenated data in a case in which the data combinations have been concatenated and on a block size used in the block encryption method.

15. The apparatus according to claim 14, wherein in a case in which the size of padding data determined based on the size of a difference between the size of first concatenated data of a first data combination and the block size is smaller than the size of the padding data determined based on the size of a difference between the block size and the size of second concatenated data of a second data combination, the selection unit selects the first data combination as one of the at least one combination.

16. The apparatus according to claim 14, wherein the selection unit selects, as one of the at least one combination, a data combination in which the size of padding data determined based on the size of a difference between the block size and the size of the concatenated data for each data combination is minimal.

17. The apparatus according to claim 14, wherein the selection unit selects, as one of the at least one combination, a data combination in which the size of padding data determined based on the size of a difference between the block size and the size of the concatenated data for each data combination is smaller than a predetermined amount.

18. The apparatus according to claim 13, further comprising:
a second communication unit including a memory and different from the communication unit and also configured to communication with the other apparatus,
wherein the plurality of pieces of data include information used for communication by the second communication unit.

19. The apparatus according to claim 18, wherein the information used for the communication by the second communication unit includes an identifier of a network generated by the second communication unit.

20. The apparatus according to claim 18, wherein the second communication unit operates in compliance with an IEEE802.11 standard series.

21. The apparatus according to claim 18, further comprising:
a printing control unit that includes a memory configured to execute print processing based on a print job received via the second communication unit.

22. A control method of a communication apparatus that includes a communication unit that includes a memory including a first storage area of a predetermined size in which access from another apparatus is permitted and a second storage area of the predetermined size in which access from the other apparatus is permitted, the method comprising:

generating concatenated encrypted data by using a block encryption method to encrypt a plurality of pieces of data which are to be read out by the other apparatus and encrypted;

holding the concatenated encrypted data generated in the encrypting in the first storage area; and holding data different from the concatenated encrypted data in the second storage area;

wherein the concatenated encrypted data generated in the encrypting is of a size not exceeding the predetermined size, and the size of padding data included in the concatenated encrypted data is smaller than the total size of padding data generated by individually encrypting the plurality of pieces of data.

23. The method according to claim 22, wherein the communication unit operates in compliance with a Bluetooth Low Energy (BLE) standard.

24. The method according to claim 23, wherein the first storage area corresponds to a characteristic of a database of a Generic Attribute Profile according to the BLE standard, and the concatenated encrypted data is held in the characteristic.

25. The method according to claim 23, wherein an information processing apparatus which is to be a communication partner of the communication apparatus via the communication unit reads out the concatenated encrypted data held in the first storage area and second concatenated encrypted data held in the second storage area, and establishes a wireless connection with the communication apparatus based on decoding results obtained by decoding the concatenated encrypted data and the second concatenated encrypted data that have been read out.

26. The method according to claim 22, wherein the communication apparatus further includes a second communication unit that is different from the communication unit and configured to communicate with the other apparatus, and the plurality of pieces of data includes information used for communication by the second communication unit.

27. The method according to claim 26, wherein the information used for communication by the second communication unit includes an identifier of a network generated by the second communication unit.

28. The method according to claim 26, wherein the second communication unit operates in compliance with an IEEE802.11 standard series.

* * * * *